O. C. TRAVER.
BATTERY CHARGING SYSTEM.
APPLICATION FILED MAY 12, 1920.

1,374,690.

Patented Apr. 12, 1921.

Inventor:
Oliver C. Traver,
by Albert G. Davis
His Attorney.

UNITED STATES PATENT OFFICE.

OLIVER C. TRAVER, OF SCHENECTADY, NEW YORK, ASSIGNOR TO GENERAL ELECTRIC COMPANY, A CORPORATION OF NEW YORK.

BATTERY-CHARGING SYSTEM.

1,374,690.  Specification of Letters Patent.  Patented Apr. 12, 1921.

Application filed May 12, 1920. Serial No. 380,844.

*To all whom it may concern:*

Be it known that I, OLIVER C. TRAVER, a citizen of the United States, residing at Schenectady, in the county of Schenectady, State of New York, have invented certain new and useful Improvements in Battery-Charging Systems, of which the following is a specification.

My invention relates to battery charging systems and particularly to arrangements for disconnecting the charging generator from the battery being charged when the voltage of the generator drops below the voltage of the battery. Arrangements of this character are well-known in the art and usually comprise an automatic switch having a shunt coil connected across the terminals of the generator and a series coil connected in the charging circuit. These coils are so arranged that they aid each other and keep the switch closed as long as the voltage of the generator exceeds a predetermined value and current flows from the generator to the battery, and buck each other and cause the switch to open when the current through the series coil reverses.

In systems where the voltage of the generator is adapted to be varied over a wide range, so that a variable number of cells may be connected in series with the generator and charged, a switch having coils connected in the manner above described, does not operate in a satisfactory manner, because the current through the shunt coil varies with the voltage of the generator, and, therefore, the amount of reverse current required to open the switch also varies with the voltage of the generator.

One object of my invention is to provide, in a battery charging system having a generator adapted to supply energy to the charging circuit and an automatic switch of the above-mentioned type for controlling the connection between the generator and the charging circuit, an arrangement whereby the voltage of the generator and the resistance of the circuit of the shunt coil may be simultaneously varied so that the voltage of the generator may be varied without varying the current through the shunt coil of the switch.

My invention will be better understood from the following description taken in connection with the accompanying drawing, and its scope will be pointed out in the appended claims.

Figure 1:
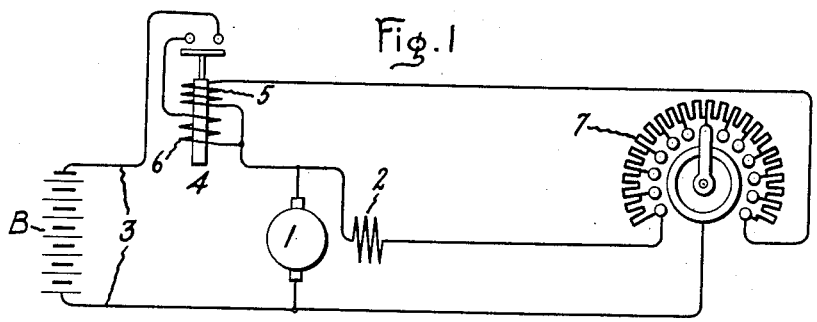
Figure 2:
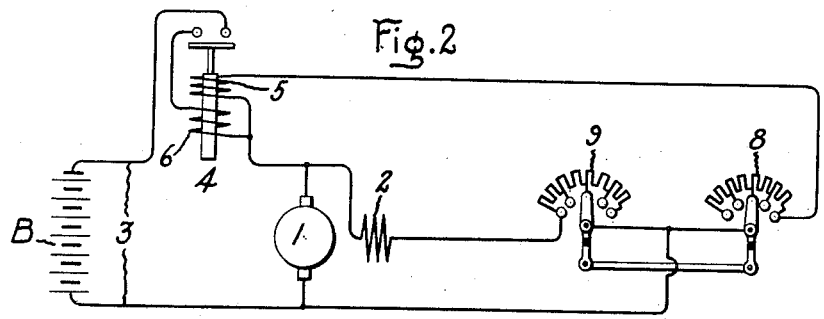

Referring to the drawing, Figure 1 shows diagrammatically one embodiment of my invention; and Fig. 2 shows a modification of the embodiment shown in Fig. 1.

Referring to Fig. 1, 1 represents a generator of any suitable type for charging a storage battery, the particular type shown being a shunt wound generator having a shunt field winding 2. 3 represents a battery charging circuit, in series with which is connected a battery B, which may have a variable number of cells.

In order to connect the generator to the charging circuit when the voltage of the generator is equal to the voltage of the battery being charged and to disconnect the generator from the charging circuit when the voltage of the generator falls below the voltage of the battery being charged I provide an automatic switch 4 of a type well-known in the art. This switch 4 comprises a shunt coil 5 connected across the armature of the generator 1 and a series coil 6 adapted to be connected in the charging circuit when the switch 4 is closed. The coil 6 is so arranged with respect to the coil 5 that it aids the coil 5 when current flows from the generator to the battery B and bucks the coil 5 when the current flows in the opposite direction. The circuit of the coil 5 is so designed that sufficient current does not flow through it to close the switch 4 until the voltage of the generator has reached a predetermined value; for example, if the voltage to be supplied to the charging circuit is 30 volts, the resistance of the circuit of the shunt coil 5 is designed so that sufficient current to close the switch 4 does not flow through the shunt winding until the generator voltage is at least 30 volts.

In order to vary the voltage of the generator so that a variable number of cells may be charged at one time, I provide an adjustable resistance 7 in the circuit of the field winding 2. I also connect this resistance in the circuit of the shunt winding 5, so that when the resistance is adjusted to vary the excitation of the generator, the resistance of the shunt coil is also varied, but inversely with respect to the resistance in the field circuit. Therefore, it will be evident that by properly designing the generator, the circuit of the shunt coil 5 and the different sections of the resistance 7 so that when one section of the resistance is cut out of the field circuit and cut into the circuit of the coil 5, the increase in the generator voltage is substantially proportional to the increase in the resistance of the circuit of coil 5, the current through the oil 5 is not materially hanged by moving the adjustable member of the resistance 7 to vary the voltage of the generator.

The operation of the system shown in Fig. 1 is as follows:

Let it be assumed that the generator is not running, and that the number of cells in the battery B is such that the charging voltage has to be 30 volts. The resistance 7 is, therefore, adjusted so that the excitation of the generator will be of such a value that when the generator is running at its normal speed the voltage of the generator will be 30 volts. At the same time the resistance in the circuit of the field winding 2 is varied, the resistance in the circuit of coil 5 is automatically varied so that the predetermined amount of current through the coil 5, to close the switch 4, will not flow until the voltage of the generator is 30 volts.

As soon as the resistance 7 has been adjusted, the prime mover (not shown) which drives the generator 1 may be started up and the generator brought up to its normal speed in any suitable manner. When the voltage of the generator reaches 30 volts, the switch 4 closes and completes the connection between the charging circuit and the generator, whereupon the series coil 6 is energized and aids the shunt coil 5 in keeping the switch 4 closed. This connection is maintained as long as the voltage of the generator exceeds the voltage of the battery. If, however, the voltage of the generator falls below the voltage of the battery, viz., 30 volts due, for example, to a decrease in its speed, the current through the series winding 6 reverses and causes the switch 4 to open, whereupon the battery is disconnected from the generator. Since the resistance 7 is adjusted so that the switch 4 cannot close until the voltage of the generator is at least 30 volts, the switch 4 remains open until the voltage of the generator is restored to 30 volts at which time the switch 4 closes and reëstablishes the connection between the battery B and the generator 1.

If the number of cells to be charged is changed, so that a charging voltage of 60 volts is required, the movable element of the adjustable resistance 7 is moved to a position where the excitation of the generator is such that, when the generator is running at normal speed, the voltage of the generator is 60 volts. At the same time the resistance in the circuit of the shunt coil 5 is automatically adjusted so that the necessary amount of current through the coil to close the switch 4 does not flow until the voltage of the generator is 60 volts. Preferably, a disconnecting switch (not shown) is provided in the battery charging circuit 3, so that the battery may be disconnected from the generator, the voltage of the generator varied the necessary amount and a new battery with a different number of cells connected in series with the generator without having to shut the generator down.

It will be apparent that I have provided an arrangement whereby the voltage of a generator and the connections of an automatic switch, controlling the connection between the charging circuit and the generator, are adjusted simultaneously so that the switch functions in the proper manner irrespective of the voltage supplied to the charging circuit.

The arrangement shown in Fig. 2 is the same as that shown in Fig. 1, except that, instead of using a single adjustable resistance, two adjustable resistances 8 and 9 are provided. The adjustable resistance 8 is connected in the circuit of the shunt coil 5 and the adjustable resistance 9 is connected in the circuit of the field winding 2. The moving elements of the two resistances are connected together and arranged in any suitable manner to simultaneously and inversely vary the resistances 8 and 9.

Since the operation of the arrangement shown in Fig. 2 is the same as that of the arrangement shown in Fig. 1, it is believed that a detailed description thereof is unnecessary.

Various modifications of my invention other than those illustrated may be made, and, therefore, I do not desire to be limited to the particular arrangements herein shown and described, but seek to cover, in the appended claims, all such modifications which do not depart from the spirit and scope of my invention.

What I claim as new and desire to secure by Letters Patent of the United States, is:

1. In combination, a battery charging circuit, a generator adapted to supply energy to said circuit, a switch controlling the connection between said generator and said circuit and having a coil connected across the terminals of said generator, and means adapted to adjust the resistance of the field circuit of said generator to vary the generator voltage and to simultaneously adjust the resistance of the circuit of said coil to maintain the current through said coil substantially constant when the generator voltage is varied by adjusting the resistance of the field circuit.

2. In combination, a battery charging circuit, a generator adapted to supply energy to said circuit, a switch controlling the connection between said generator and said circuit and having a coil connected across the terminals of said generator, and means adapted to vary simultaneously the resistance of the field circuit of said generator and of the circuit of said coil to maintain the current through said coil substantially constant when the generator voltage is varied by adjusting the resistance of the field circuit.

3. In combination, a battery charging circuit, a generator adapted to supply energy to said circuit, a switch controlling the connection between said generator and said circuit and having a coil connected across the terminals of said generator, a resistance in the circuit of said coil, a resistance in the field circuit of generator, and means for simultaneously adjusting said resistances to vary the voltage of said generator without substantially varying the current through said coil.

4. In combination, a battery charging circuit, a generator adapted to supply energy to said circuit, a switch controlling the connection between said circuit and said generator, said switch comprising a shunt coil connected across the terminals of said generator and a coil connected in series with said charging circuit and arranged so as to aid said shunt coil when current flows from said generator to battery circuit, a resistance in the circuit of said shunt coil, a resistance in the field circuit of said generator, and means for simultaneously adjusting said resistances to vary the voltage of said generator without materially varying the current through said shunt coil.

In witness whereof I have hereunto set my hand this 11th day of May, 1920.

OLIVER C. TRAVER.